US012712121B2

(12) United States Patent
Liang et al.

(10) Patent No.: US 12,712,121 B2
(45) Date of Patent: Aug. 18, 2026

(54) MULTI-PHASE COUPLED INDUCTOR

(71) Applicant: CHILISIN ELECTRONICS CORP., Taoyuan City (TW)

(72) Inventors: Hung-Chih Liang, Taoyuan City (TW); Pin-Yu Chen, Taoyuan City (TW); Hang-Chun Lu, Taoyuan City (TW); Ya-Wen Yang, Taoyuan City (TW); Yu-Ting Hsu, Taoyuan City (TW); Wei-Zhi Huang, Taoyuan City (TW)

(73) Assignee: CHILISIN ELECTRONICS CORP., Taoyuan City (TW)

( * ) Notice: Subject to any disclaimer, the term of this patent is extended or adjusted under 35 U.S.C. 154(b) by 550 days.

(21) Appl. No.: 18/479,123

(22) Filed: Oct. 2, 2023

(65) Prior Publication Data

US 2024/0136117 A1 Apr. 25, 2024
US 2024/0234020 A9 Jul. 11, 2024

(30) Foreign Application Priority Data

Oct. 20, 2022 (TW) ................................. 111139735

(51) Int. Cl.

| | |
|---|---|
| ***H01F 27/28*** | (2006.01) |
| ***H01F 17/04*** | (2006.01) |
| ***H01F 27/26*** | (2006.01) |
| ***H01F 27/30*** | (2006.01) |

(52) U.S. Cl.
CPC ......... *H01F 27/306* (2013.01); *H01F 27/266* (2013.01)

(58) Field of Classification Search
CPC ........ H01F 27/28; H01F 27/26; H01F 27/263; H01F 27/266; H01F 27/306; H01F 27/2823; H01F 17/04; H01F 17/045; H01F 3/06; H01F 2027/2847; H01F 2027/2857; H01F 41/02; H01F 41/022; H01F 41/04; H01F 41/06
USPC .......... 336/221, 222, 223, 230, 65, 192, 199
See application file for complete search history.

(56) References Cited

U.S. PATENT DOCUMENTS

| | | | | |
|---|---|---|---|---|
| 11,501,906 | B2 * | 11/2022 | Chen | H01F 17/04 |
| 12,020,838 | B2 * | 6/2024 | Chen | H01F 41/0246 |
| 2022/0208425 | A1 | 6/2022 | Lu et al. | |
| 2025/0095917 | A1 * | 3/2025 | Lin | H01F 27/2828 |

FOREIGN PATENT DOCUMENTS

| | | |
|---|---|---|
| CN | 114496531 A | 5/2022 |
| TW | M560685 U | 5/2018 |

* cited by examiner

*Primary Examiner* — Hai L Nguyen
(74) *Attorney, Agent, or Firm* — Li & Cai Intellectual Property Office

(57) ABSTRACT

A multi-phase coupled inductor includes a first iron core, a second iron core, and a plurality of coil windings. The first iron core includes a first body and a plurality of first core posts. The plurality of first core posts are connected to the first body. The second iron core is opposite to the first iron core. The second iron core and the first body are spaced apart from each other by a gap. The plurality of coil windings wrap around the plurality of first core posts, respectively. Each of the coil windings has at least two coils.

10 Claims, 8 Drawing Sheets

MULTI-PHASE COUPLED INDUCTOR

CROSS-REFERENCE TO RELATED PATENT APPLICATION

This application claims the benefit of priority to Taiwan Patent Application No. 111139735, filed on Oct. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an inductor, and more particularly to a multi-phase coupled inductor.

BACKGROUND OF THE DISCLOSURE

In a buck-boost circuit for power supply on a circuit board inside an electronic product, multiple inductors are usually used to meet required characteristics and functions. In the related art, when the multiple inductors are soldered on the circuit board, the inductors take up a lot of space on the circuit board and reduce an available area for arranging other electronic components on the circuit board. In addition, multiple independent inductors working together can cause a significant rise in temperature, which reduces the efficiency of the inductors.

Therefore, how to design a single multi-phase coupled inductor having structural improvements which can overcome the above-mentioned inadequacies has become an important issue to be addressed in the relevant art.

SUMMARY OF THE DISCLOSURE

In response to the above-referenced technical inadequacy, the present disclosure provides a multi-phase coupled inductor, which includes a first iron core, a second iron core, and a plurality of coil windings. The first iron core includes a first body and a plurality of first core posts, and the plurality of first core posts are connected to the first body. The second iron core is opposite to the first iron core, and the second iron core and the first body are spaced apart from each other by a gap. The plurality of coil windings respectively wrap around the plurality of first core posts, respectively. Each of the coil windings has at least two coils.

Therefore, in the multi-phase coupled inductor provided by the present disclosure, by virtue of "the multi-phase coupled inductor including a plurality of coil windings," and "the plurality of coil windings respectively wrapping around the plurality of first core posts, and each of the coil windings having at least two coils," the multiple coil windings can be integrated into a single inductor to save space on the circuit board and increase the inductance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
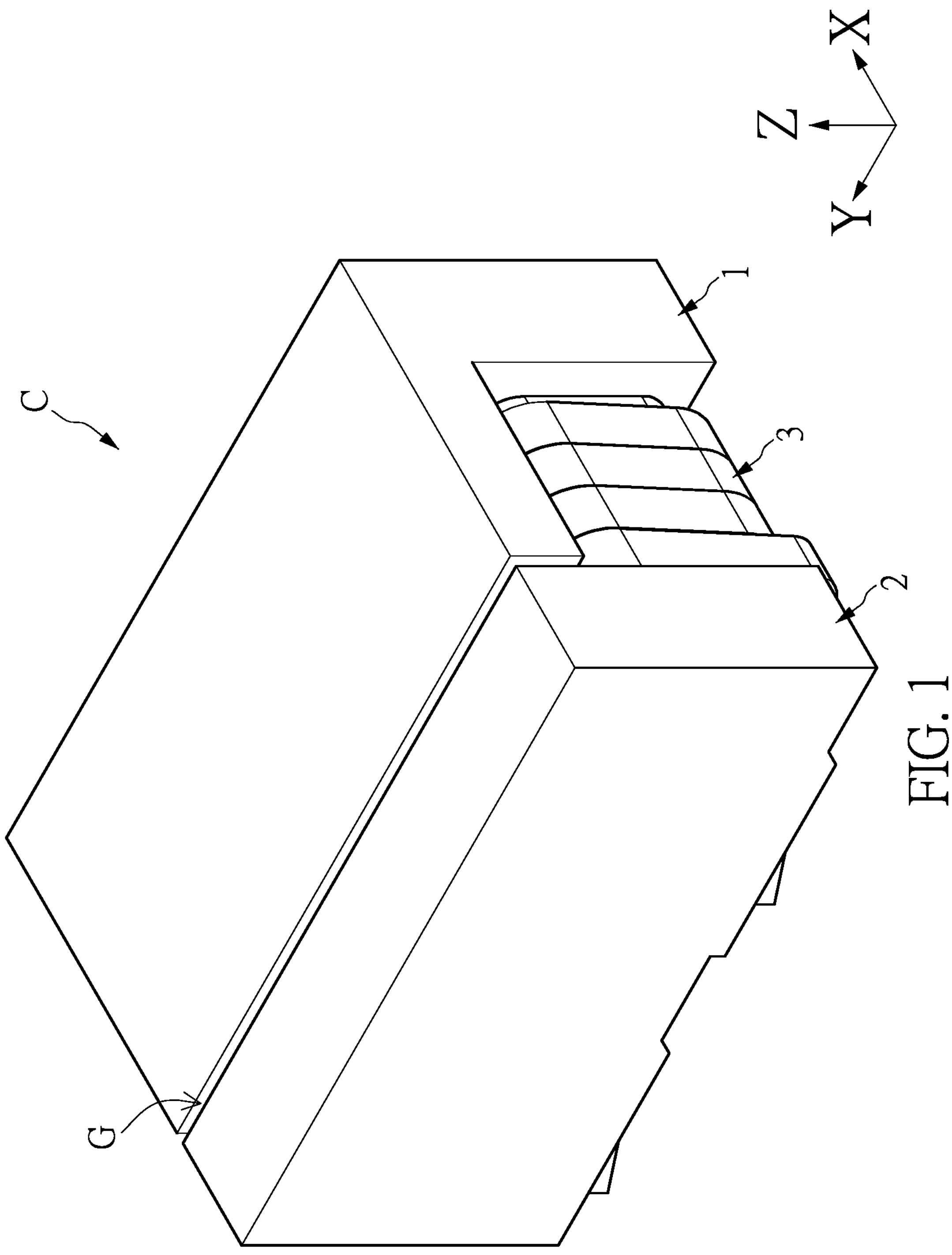
FIG. 1 is a schematic view of a multi-phase coupled inductor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
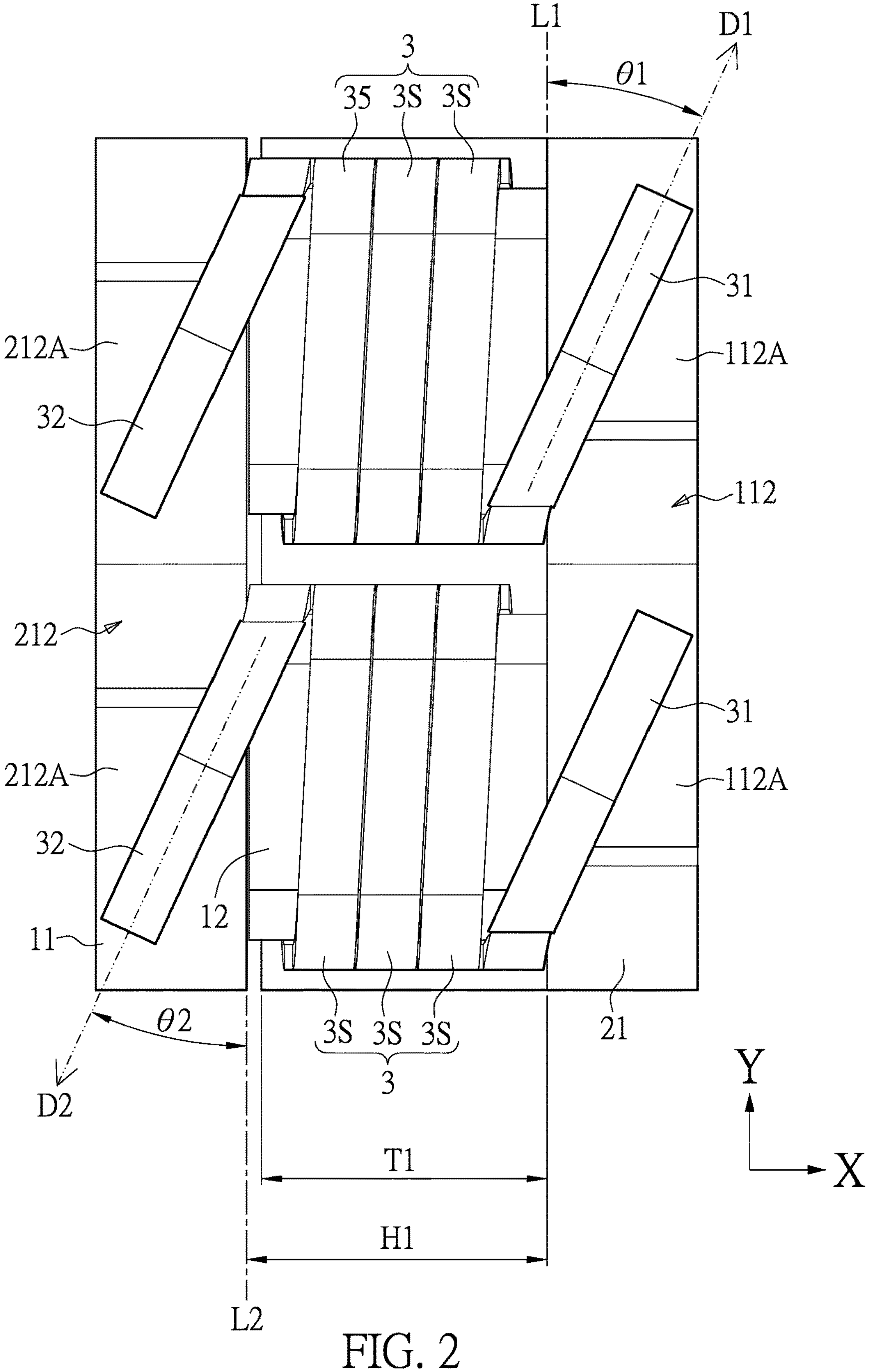
FIG. 2 is a schematic top view of the multi-phase coupled inductor according to the first embodiment of the present disclosure.
Figure 3:
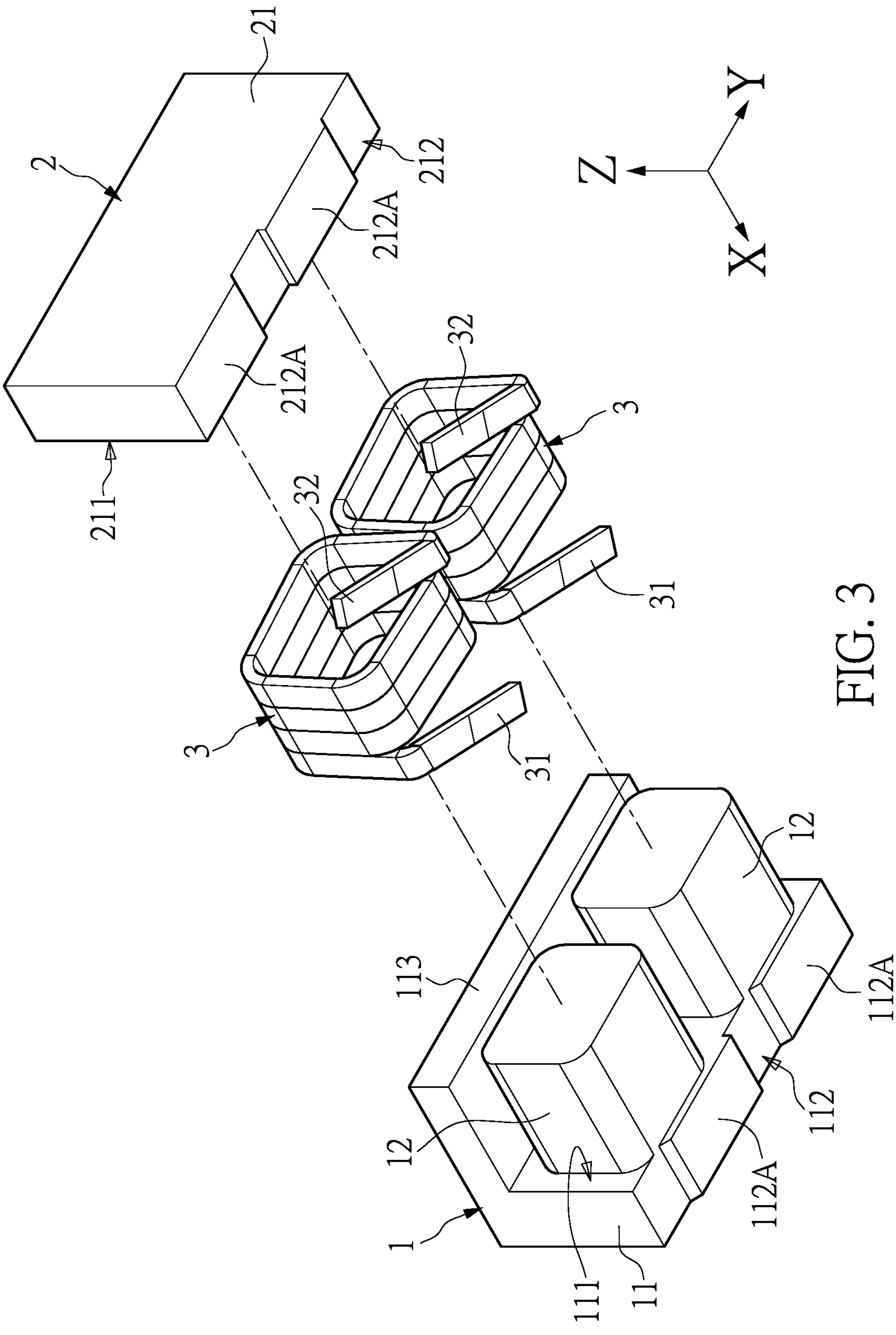
FIG. 3 is a schematic exploded view of the multi-phase coupled inductor according to the first embodiment of the present disclosure.

Referring to FIG. 1 to FIG. 3, FIG. 1 is a schematic view of a multi-phase coupled inductor according to a first embodiment of the present disclosure, FIG. 2 is a schematic top view of the multi-phase coupled inductor according to the first embodiment of the present disclosure, and FIG. 3 is a schematic exploded view of the multi-phase coupled inductor according to the first embodiment of the present disclosure. A first embodiment of the present disclosure provides a multi-phase coupled inductor C, which includes a first iron core 1, a second iron core 2, and a plurality of coil windings 3. The first iron core 1 includes a first body 11 and a plurality of first core posts 12. The first body 11 is L-shaped. The plurality of first core posts 12 are connected to the first body 11. Moreover, the second iron core 2 includes a second body 21, and the second body 21 forms a shape of the letter "I". The second iron core 2 is opposite to the first iron core 1. The second iron core 2 and the first body 11 are spaced apart from each other by a gap G. Therefore, by controlling the size of the gap G, the coupling effect of the multi-phase coupling inductor C can be adjusted to improve the operating efficiency of the inductor and reduce the temperature of the inductor.

It is worth mentioning that the second iron core 2 is a sheet structure that is I-shaped, and has a simpler configuration than that of the first iron core 1 (which is L-shaped). It does not need to take time to control in the manufacturing process, and has the benefit of reducing the manufacturing cost during production. Therefore, in the process of manufacturing the inductor, it is only necessary to control the shape of the first body 11 of the first iron core 1 to achieve the purpose of adjusting the size of the gap G.

The first iron core 1 and the second iron core 2 can be made of ferrite, and each of the coil windings is made of a flat wire. As shown in FIG. 2 and FIG. 3, a plurality of flat wires respectively wrap around the plurality of first core posts 12 to form the plurality of coil windings 3, and each flat wire wraps around a corresponding one of the first core posts 12 at least twice. In other words, each of the coil windings 3 has at least two coils 3S. In the embodiments of the present disclosure, each of the coil winding 3 can have three coils 3S, but the present disclosure is not limited thereto. In addition, cross-sectional shapes of the flat wires used to make the coil windings 3 are rectangular. Therefore, a cross-sectional shape of each of the coils 3S is rectangular.

Furthermore, the coil windings 3 of the multi-phase coupled inductor C provided by the present disclosure are made of flat wires, and the flat wires are easily bent, which enables them to wrap around the first core 12 for forming the coils. The larger the quantity of coils of the coil windings 3 is, the greater the inductance that the inductor can generate. Therefore, by having the coil windings 3 being made of the flat wires, the inductance of the multi-phase coupled inductor C can reach about 100 μH.

As shown in FIG. 2 and FIG. 3, the first body 11 includes a first side surface 111 and a second bottom surface 112, and the second body 21 has a second side surface 211 and a second bottom surface 212. One end of each of the first core posts 12 is connected to the first side surface 111, and another end of each of the first core posts 12 abuts against the second side surface 211. The first bottom surface 112 forms a plurality of first protruding portions 112A, and the second bottom surface 212 forms a plurality of second protruding portions 212A. Each of the coil windings 3 further includes a first contact portion 31 and a second contact portion 32. The first contact portion 31 extends along a first direction D1, and the second contact portion 32 extends along a second direction D2. The first side surface 111 and the first bottom surface 112 intersect with each other at a first edge line L1, and the second side surface 211 and the second bottom surface 212 intersect with each other at a second edge line L2. The first direction D1 and the first edge line L1 form a first inclined angle θ1, the second direction D2 and the second edge line L2 form a second inclined angle θ2, and each of the first inclined angle θ1 and the second inclined angle θ2 ranges between 0 degrees and 90 degrees. Through structural design of the first inclined angle θ1 and the second inclined angle θ2, an orthogonal projection of the first contact portion 31 that is projected onto the first bottom surface 112 overlaps with a surface of a corresponding one of the first protruding portions 112A, and an orthogonal projection of the second contact portion 32 that is projected onto the second bottom surface 212 overlaps with a surface of a corresponding one of the second protruding portions 212A.

In continuation of the above, the orthogonal projections of the first contact portion 31 and the second contact portion 32 of each of the coil windings 3 that are projected onto the first bottom surface 112 and the second bottom surface 212 overlap with the surfaces of corresponding ones of the first protruding portions 112A and the second protruding portions 212A. Therefore, the first contact portion 31 is located between the first iron core 1 and a circuit board, and the second contact portion 32 is located between the second iron core 2 and the circuit board. Therefore, when the multi-phase coupled inductor C is fixed on the circuit board (not shown in the figures), the first protruding portion 112A of the first iron core 1 will be soldered on the circuit board together with the first contact portion 31 of each of the coil windings 3. Similarly, the second protruding portions 212A of the second iron core 2 and the second contact portions 32 of the coil windings 3 are soldered on the circuit board. Since each of the coil windings 3 is made of a flat wire (the cross-section is rectangular and the contact area is relatively larger), the contact resistance between the coil windings 3 and the circuit board can be reduced, and a soldering area between the multi-phase coupled inductor C and the circuit board is increased, thereby enhancing the stability of the multi-phase coupled inductor C that is soldered to the circuit board.

The first body 11 further includes a first end surface 113, the gap G is located between the first end surface 113 and the second side surface 211, and a length H1 of each of the first core posts 12 is greater than a distance T1 between the first end surface 113 and the first side surface 111. As shown in FIGS. 1 and 2, the gap G is approximately equal to a difference between the length H1 and the distance T1.

Second Embodiment

Figure 4:
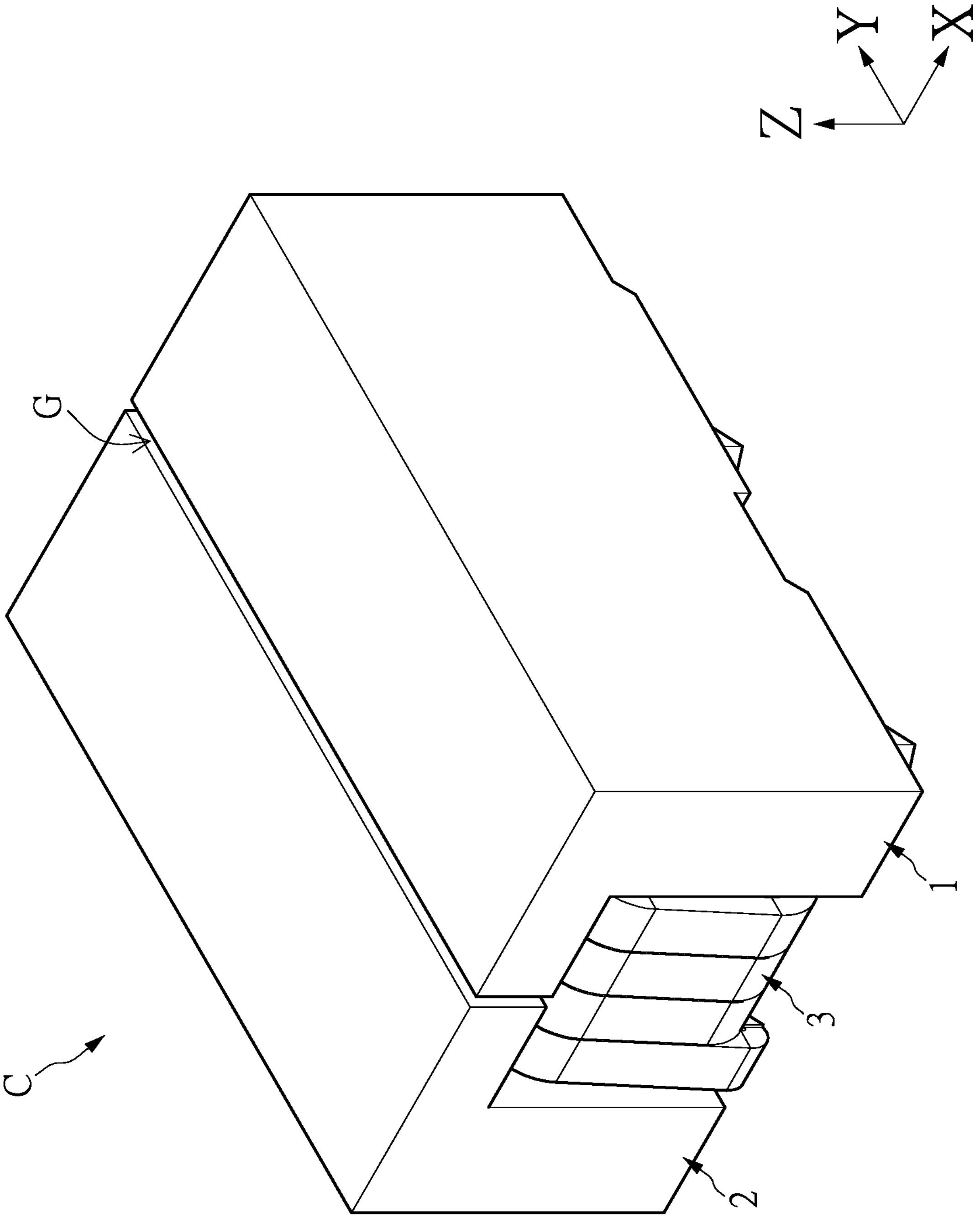
FIG. 4 is a first schematic view of a multi-phase coupled inductor according to a second embodiment of the present disclosure.
Figure 5:
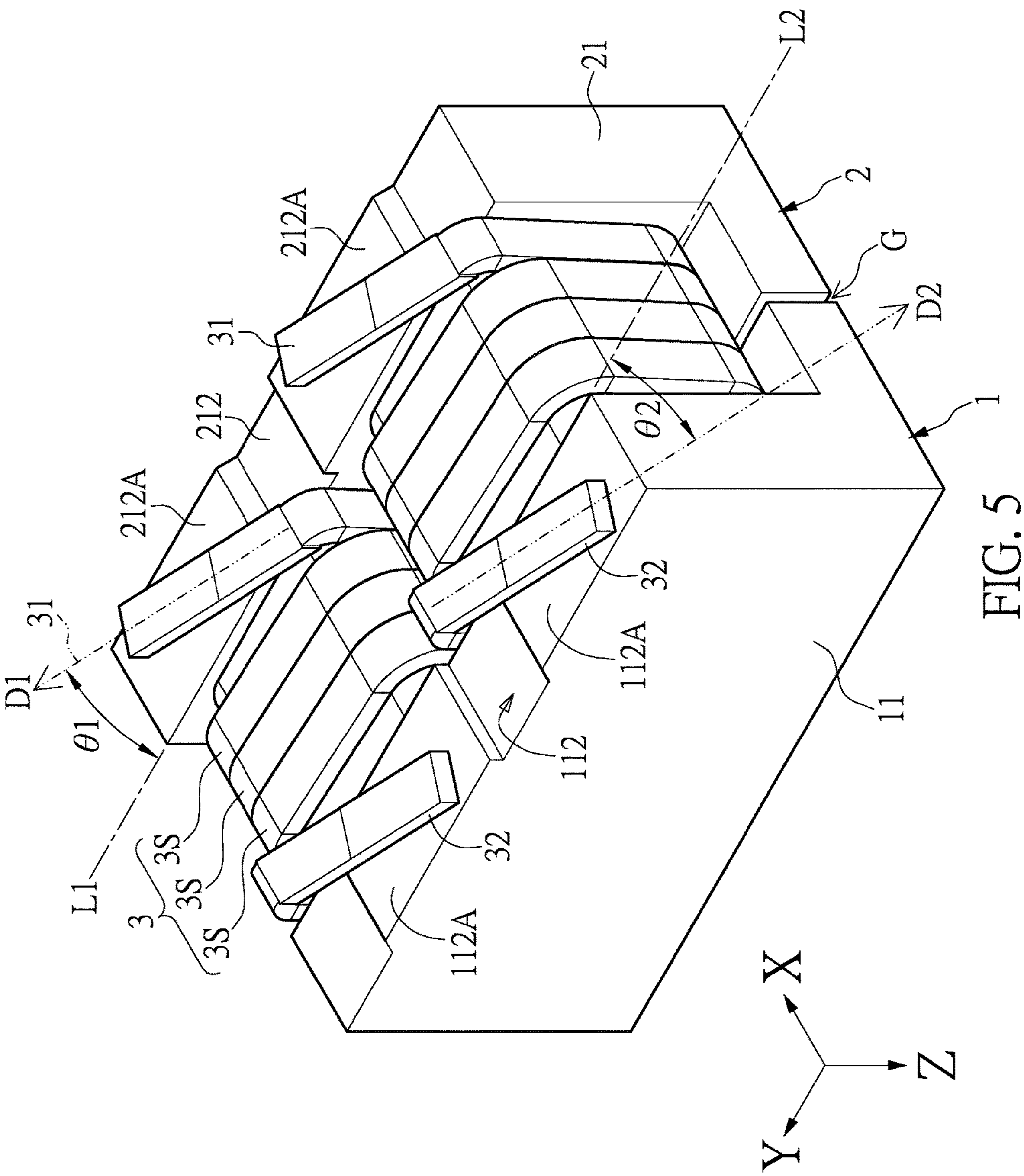
FIG. 5 is a second schematic view of the multi-phase coupled inductor according to the second embodiment of the present disclosure.
Figure 6:
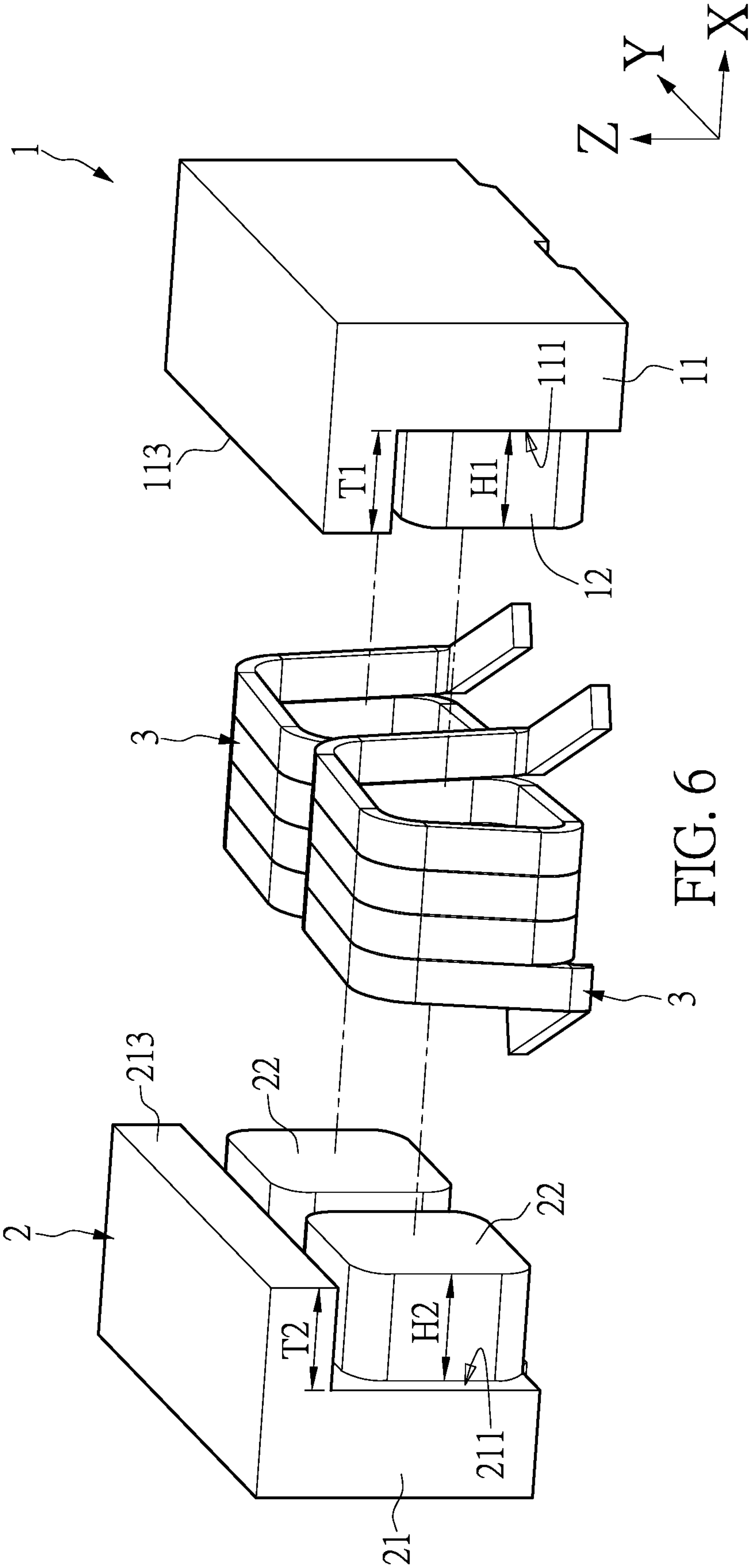
FIG. 6 is a schematic exploded view of the multi-phase coupled inductor according to the second embodiment of the present disclosure.

Referring to FIG. 4 to FIG. 6, FIG. 4 is a first schematic view of a multi-phase coupled inductor according to a second embodiment of the present disclosure, FIG. 5 is a second schematic view of the multi-phase coupled inductor according to the second embodiment of the present disclosure, and FIG. 6 is a schematic exploded view of the multi-phase coupled inductor according to the second embodiment of the present disclosure. Comparing FIG. 3 with FIG. 6, the structure of the multi-phase coupled inductor C provided by the second embodiment is similar to that of the first embodiment, and will not be reiterated herein. The main difference between the second embodiment and the first embodiment is as follows: in the second embodiment, the second iron core 2 of the multi-phase coupled inductor C includes a second body 21 and a plurality of second core posts 22. In other words, the first iron core 1 and the second iron core 2 have the same structural features. Each of the coil windings 3 wraps around corresponding ones of both the first core posts 12 and the second core posts 22.

As shown in FIG. 5 and FIG. 6, the first body 11 has a first side surface 111 and a first bottom surface 112, and the second body 21 has a second side surface 211 and a second bottom surface 21. The plurality of first core posts 12 are connected to the first side surface 111. The plurality of second core posts 22 are connected to the second side surface 211. The plurality of the first core posts 12 respectively abut against the plurality of second core posts 22. The first bottom surface 112 forms a plurality of first protruding portions 112A, and the second bottom surface 212 forms a plurality of second protruding portions 212A. The first contact portion 31 extends along a first direction D1, and the second contact portion 32 extends along a second direction D2. The first side surface 111 and the first bottom surface 112 intersect with each other at a first edge line L1. The second side surface 211 and the second bottom surface 212 intersect with each other at a second edge line L2. The first direction D1 and the first edge line L1 form a first inclined angle θ1, the second direction D2 and the second edge line L2 form a second inclined angle θ2, and each of the first inclined angle θ1 and the second inclined angle θ2 ranges between 0 degrees and 90 degrees. Through structural design of the first inclined angle θ1 and the second inclined angle θ2, an orthogonal projection of the first contact portion 31 that is projected onto the first bottom surface 112 overlaps with a surface of the corresponding one of the first protruding portion 112A, and an orthogonal projection of the second contact portion 32 that is projected onto the second bottom surface 212 overlaps with a surface of the corresponding one of the second protruding portion 212A.

In addition, the first body 11 further includes a first end surface 113, and the second body 21 includes a second end surface 213. The gap G is located between the first end surface 113 and the second end surface 213. A length H1 of each of the first core posts 12 is greater than a distance T1 between the first end surface 113 and the first side surface 111. A length H2 of each of the second core posts 22 is greater than a distance T2 between the second end surface 213 and the second side surface 211. As shown in FIGS. 5 and 6, the gap G is approximately equal to a difference between a sum of the lengths H1 and H2 and a sum of the distances T1 and T2.

Third Embodiment

Figure 7:
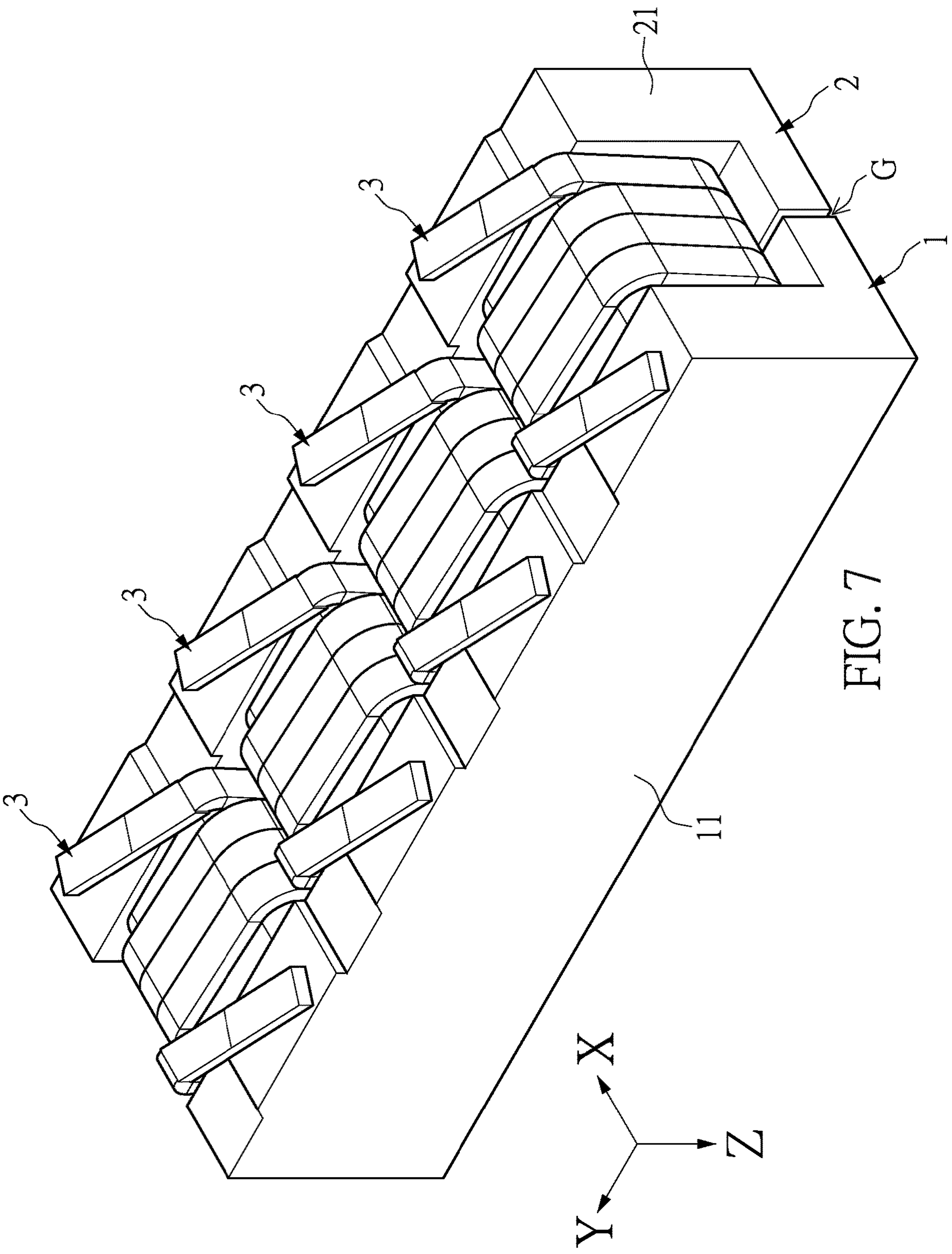
FIG. 7 is a schematic view of a multi-phase coupled inductor according to a third embodiment of the present disclosure.

Referring to FIG. 7, FIG. 7 is a schematic view of a multi-phase coupled inductor according to a third embodiment of the present disclosure. Comparing FIG. 5 with FIG. 7, the structure of the multi-phase coupled inductor C provided by the third embodiment is similar to that of the second embodiment, and will not be reiterated herein. The main difference between the third embodiment and the second embodiment is as follows: in the third embodiment, the multi-phase coupled inductor C is a four-in-one inductor structure that includes four coil windings 3, the first iron core 1 includes four first core posts 12, and the second iron core 2 includes four second core posts 22. However, the aforementioned description for the multi-phase coupled inductor C of the third embodiment is merely an example, and is not meant to limit the scope of the present disclosure. A quantity of the coil windings 3 is not limited in the present disclosure.

Beneficial Effects of the Embodiments

The multi-phase coupled inductor provided by the present disclosure is an all-in-one inductor that integrates multiple coil windings 3 into a same element, which can replace a need for multiple independent single-phase inductors to be arranged on the circuit board. Therefore, the multi-phase coupled inductor C of the present disclosure has the advantage of saving space on the circuit board.

Figure 8:
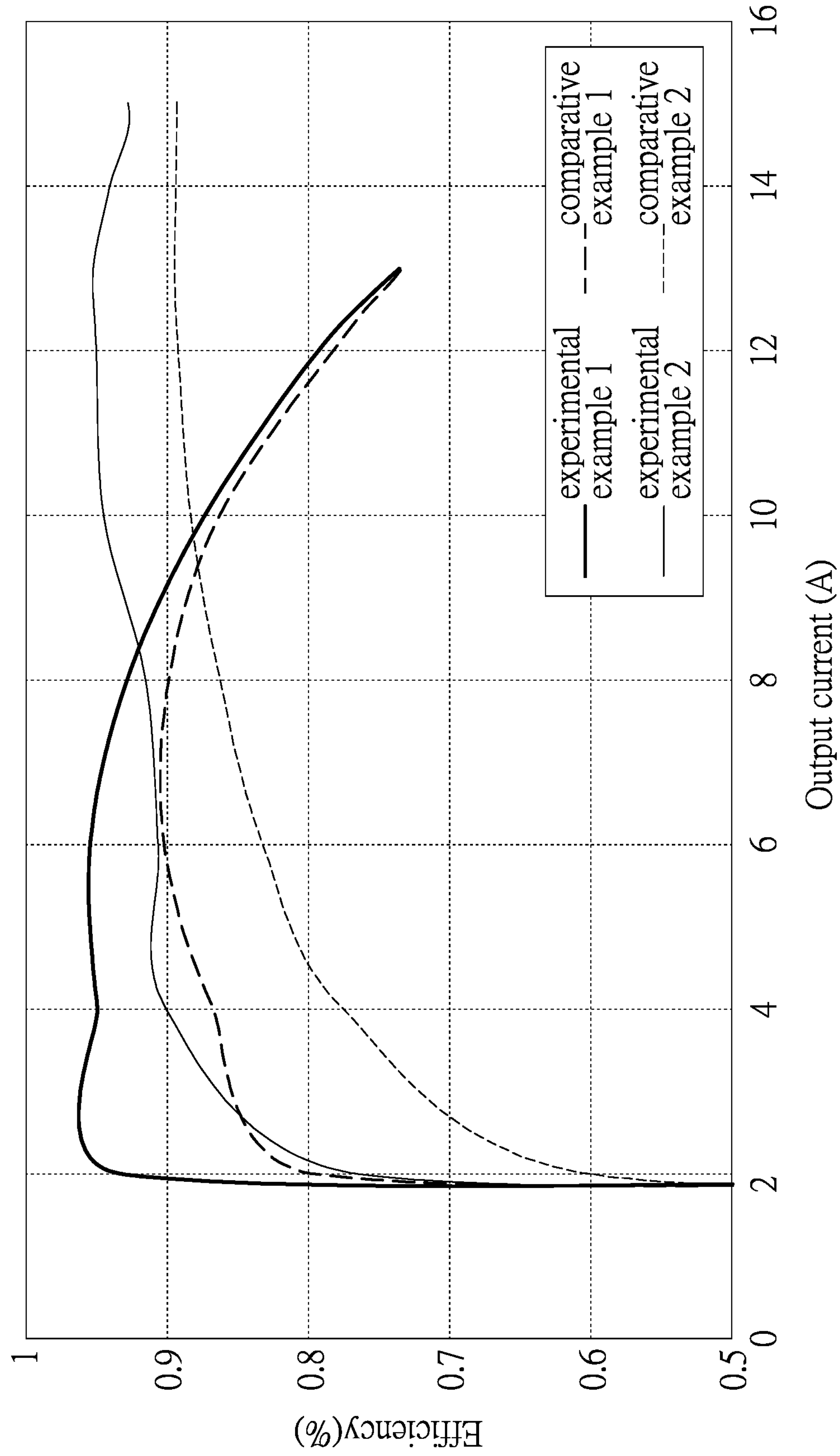
FIG. 8 is a curve diagram of an efficiency of the multi-phase coupled inductor according to the present disclosure.

Referring to FIG. 8, FIG. 8 is a curve diagram of an efficiency of the multi-phase coupled inductor according to the present disclosure. Experimental example refers to a curve of an efficiency produced by the multi-phase coupled inductor C of the present disclosure on the circuit board, and comparative example refers to a curve of an efficiency produced by the multiple independent single-phase inductors on the circuit board. For example, the conditions of experimental example 1 and comparative example 1 are that the input voltage (Vin) is 30V and the output voltage (Vout) is 55V, while the conditions of experimental example 2 and comparative example 2 are that the input voltage (Vin) is 60V and the output voltage (Vout) is 35V. From the output currents generated under different conditions shown in FIG. 8, it can be seen that the multi-phase coupled inductor C provided by the present disclosure can produce a higher efficiency than the multiple independent single-phase inductors.

In the related art, the coil windings of the inductor are made of copper foil that is stamped and bent from sheet metal. If the copper foil is excessively bent, an insulating layer on a surface of the copper foil will be damaged to affect its characteristics. Therefore, the coil windings that are made of copper foil stamped and bent from sheet metal cannot form multiple coils. The inductance of the inductor made through this way is usually too low and cannot exceed 1 μH. In contrast, the coil windings 3 of the multi-phase coupled inductor C provided by the present disclosure are made of flat wires. The flat wires can be easily bent, so as to wrap around the first core posts 12 to form a plurality of coils. The larger the quantity of coils of the coil windings 3 is, the greater the inductance that the inductor can generate. Therefore, the multi-phase coupled inductor C provided by the present disclosure can generate a high inductance of about 100 μH by virtue of the coil windings 3 being made of the flat wires.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-phase coupled inductor, comprising:

a first iron core including a first body and a plurality of first core posts, wherein the plurality of first core posts are connected to the first body;

a second iron core being opposite to the first iron core, wherein the second iron core and the first body are spaced apart from each other by a gap; and;

a plurality of coil windings respectively wrapped around the plurality of first core posts, wherein each of the coil windings has at least two coils.

2. The multi-phase coupled inductor according to claim 1, wherein each of the coil windings is made of a flat wire.

3. The multi-phase coupled inductor according to claim 2, wherein the first body is L-shaped, the second iron core includes a second body, and the second body is L-shaped.

4. The multi-phase coupled inductor according to claim 3, wherein the first body includes a first side surface and a second bottom surface, the second body has a second side surface and a second bottom surface, one end of each of the first core posts is connected to the first side surface, another end of each of the first core posts abuts against the second side surface, the first bottom surface forms a plurality of first protruding portions, the second bottom surface forms a plurality of second protruding portions, each of the coil windings further includes a first contact portion and a second contact portion, an orthogonal projection of the first contact portion that is projected onto the first bottom surface overlaps with a surface of the first protruding portion, and an orthogonal projection of the second contact portion that is projected onto the second bottom surface overlaps with a surface of the second protruding portion.

5. The multi-phase coupled inductor according to claim 4, wherein the first contact portion extends along a first direction, the second contact portion extends along a second direction, the first side surface and the first bottom surface intersect with each other at a first edge line, the second side surface and the second bottom surface intersect with each other at a second edge line, the first direction and the first edge line form a first inclined angle, the second direction and the second edge line form a second inclined angle, and each of the first inclined angle and the second inclined angle ranges between 0 degrees and 90 degrees.

6. The multi-phase coupled inductor according to claim 4, wherein the first body further includes a first end surface, the gap is located between the first end surface and the second side surface, and a length of each of the first core posts is greater than a distance between the first end surface and the first side surface.

7. The multi-phase coupled inductor according to claim 2, wherein the first body is L-shaped, the second iron core includes a second body and a plurality of second core posts, the second body is L-shaped, and the plurality of second core posts are connected to the second body.

8. The multi-phase coupled inductor according to claim 7, wherein the first body has a first side surface and a first bottom surface, the second body has a second side surface and a second bottom surface, the plurality of first core posts are connected to the first side surface, the plurality of second core posts are connected to the second side surface, the plurality of the first core posts respectively abut against the plurality of second core posts, the first bottom surface forms a plurality of first protruding portions, the second bottom surface forms a plurality of second protruding portions; wherein each of the coil windings includes a first contact portion and a second contact portion, an orthogonal projection of the first contact portion that is projected onto the first bottom surface overlaps with a surface of the first protruding portion, and an orthogonal projection of the second contact portion that is projected onto the second bottom surface overlaps with a surface of the second protruding portion.

9. The multi-phase coupled inductor according to claim 8, wherein the first contact portion extends along a first direction, the second contact portion extends along a second direction, the first side surface and the first bottom surface intersect with each other at a first edge line, the second side surface and the second bottom surface intersect with each other at a second edge line, the first direction and the first edge line form a first inclined angle, the second direction and the second edge line form a second inclined angle, and each of the first inclined angle and the second inclined angle ranges between 0 degrees and 90 degrees.

10. The multi-phase coupled inductor according to claim 8, wherein the first body further includes a first end surface, the second body further includes a second end surface, the gap is located between the first end surface and the second end surface, a length of each of the first core posts is greater than a distance between the first end surface and the first side surface, and a length of each of the second core posts is greater than a distance between the second end surface and the second side surface.

* * * * *